(12) United States Patent
Shibata et al.

(10) Patent No.: US 6,616,331 B2
(45) Date of Patent: Sep. 9, 2003

(54) METHOD FOR PREDICTING TEMPERATURE AND TEST WAFER FOR USE IN TEMPERATURE PREDICTION

(75) Inventors: Satoshi Shibata, Takaoka (JP); Yuko Nambu, Otsu (JP)

(73) Assignee: Matsushita Electric Industrial Co., LTD (JP)

( * ) Notice: Subject to any disclaimer, the term of this patent is extended or adjusted under 35 U.S.C. 154(b) by 0 days.

(21) Appl. No.: 09/984,914

(22) Filed: Oct. 31, 2001

(65) Prior Publication Data

US 2002/0075936 A1 Jun. 20, 2002

(30) Foreign Application Priority Data

Nov. 2, 2000 (JP) ........................ 2000-335500

(51) Int. Cl.[7] ......................... G01K 1/02; G01K 13/00; G01K 15/00; H01L 21/66; C30B 1/02
(52) U.S. Cl. ..................... 374/141; 374/1; 374/102; 374/149; 438/14; 438/16; 117/8; 219/497; 392/416
(58) Field of Search ................ 374/141, 1, 6, 374/7, 102, 101, 137, 149; 438/14, 16, 17, 18, 7, 54; 117/8, 10, 201; 29/25.01; 219/497, 502; 392/416; 118/724, 725

(56) References Cited

U.S. PATENT DOCUMENTS 4,786,608 A * 11/1988 Griffith .................. 438/766
5,769,540 A * 6/1998 Schietinger et al. .......... 374/7
5,994,676 A * 11/1999 Dutartre ................. 219/497
6,126,744 A * 10/2000 Hawkins et al. ............ 374/137
6,128,084 A * 10/2000 Nanbu et al. ............... 356/369
6,200,023 B1 * 3/2001 Tay et al. ................... 374/1
6,472,232 B1 * 10/2002 Johnson et al. .............. 438/14
6,475,815 B1 * 11/2002 Nambu et al. ............... 438/14

FOREIGN PATENT DOCUMENTS

JP       2000232142 A     8/2000
WO       WO98/57146 A1    12/1998

OTHER PUBLICATIONS

Csepregi, L., et al., "Reordering of amorphous layers of Si implanted with 31P and 75As, and 11B ions," Journal of Applied Physics (Oct. 1977) vol. 48, No. 10, pp. 4234–4240.*

* cited by examiner

Primary Examiner—Diego Gutierrez
Assistant Examiner—Stanley J. Pruchnic, Jr.
(74) Attorney, Agent, or Firm—Nixon Peabody LLP; Jeffrey L. Costellia

(57) ABSTRACT

A test wafer for use in temperature prediction is prepared. The test wafer includes: first semiconductor layer formed in a crystalline state; second semiconductor layer formed in an amorphous state on the first semiconductor layer; and passivation film formed over the second semiconductor layer. Next, the test wafer is loaded into a device fabrication system and then heated therein at a predetermined period of time. Thereafter, a recovery rate, at which part of the second semiconductor layer recovers from the amorphous state to the crystalline state at the interface with the first semiconductor layer, is calculated. Then, a temperature of the test wafer that has been heated is measured according to a relationship between the recovery rate and a temperature corresponding to the recovery rate.

13 Claims, 11 Drawing Sheets

METHOD FOR PREDICTING TEMPERATURE AND TEST WAFER FOR USE IN TEMPERATURE PREDICTION

BACKGROUND OF THE INVENTION

The present invention relates to a method for predicting temperature and also relates to a test wafer for use in temperature prediction. More particularly, this invention provides measures to predict more accurately the actual temperature or temperature distribution of a wafer to be loaded into a thermal processing system (e.g., a plasma-enhanced thermal processing system, in particular) for use as part of the equipment for manufacturing semiconductor devices.

A method for predicting the temperature (the actual temperature) of a wafer to be loaded into a thermal processing system, in which the wafer should be subjected to intense heat in a semiconductor device fabrication process, was disclosed in PCT International Publication No. WO 98/57146.

Hereinafter, the wafer temperature predicting method disclosed in this publication will be described with reference to the drawings.

First, as shown in FIG. 10A, dopant ions are implanted into a silicon wafer 101, thereby forming an amorphous layer 110a with a thickness t0 in the uppermost part of the silicon wafer 101. As a result, the silicon wafer 101 now consists of the amorphous layer 101a as the uppermost part thereof and a crystalline layer 101b as the other part thereof.

Next, as shown in FIG. 10B, the silicon wafer 101 including the amorphous layer 101a is loaded into a thermal processing system such as a chemical vapor deposition (CVD) system. Then, a silicon dioxide film 102 is deposited over the amorphous layer 101a. In the meantime, crystals start to grow epitaxially from the interface between the amorphous and crystalline layers 101a and 101b, thereby crystallizing the lowermost part of the amorphous layer 101a. As a result, the amorphous layer 101a has its thickness decreased from its initial thickness t0 to t1. In this case, the thickness of the amorphous layer 101a is measured with a spectroscopic ellipsometer. In FIG. 10B, the interface between the amorphous and crystalline layers 101a and 101b, as shown in FIG. 10A, not subjected to heat during the deposition of the silicon dioxide film 102 is indicated as the broken line drawn in the crystalline layer 101b.

Then, the decrease in thickness of the amorphous layer 101a per unit time, i.e., the rate R at which that part of the amorphous layer 101a recovers from the amorphous state to crystalline state, is calculated by $$R=|t1-t0|/a$$

where the thermal processing is supposed to have been performed for a period of time a (s) and $0 \leq t1 \leq t0$.

It is believed that if the recovery rate R given by this equation is applied to the graph shown in FIG. 11, the actual temperature of a silicon wafer to be processed can be predicted. The graph shown in FIG. 11 illustrates a relationship between the recovery rate R and the temperature T and was drawn after J. Appl. Phys. Vol. 48, No. 10 (1997), p. 4234. It should be noted that the amorphous layer 101a may be formed by implanting arsenic (As) ions into the wafer 101.

The present inventors carried out various experiments on the known method for predicting a wafer temperature. As a result, we found that the actual wafer temperature could not be predicted accurately enough by the known method when the method was applied to a thermal processing system for a relatively low-temperature process (e.g., plasma CVD or plasma etching process).

This is because the uppermost part of the amorphous layer 101a in the silicon wafer 101 is unintentionally oxidized by an oxygen plasma in the process step shown in FIG. 10B. That is to say, the amorphous layer 101a is not thinned just because the lowermost part of the amorphous layer 101a is crystallized around the interface with the crystalline layer 101b by heat treatment in the thermal processing system. In addition, the uppermost part of the amorphous layer 101a is oxidized and thus disappears through the plasma processing.

As a result, that part of the amorphous layer 101a, which is supposed to have recovered to the crystalline state through the crystallization alone, has a thickness greater than expected. Accordingly, the resultant recovery thickness (t0–t1) or recovery rate R increases excessively. Thus, the rate R of recovery from the amorphous to the crystalline state cannot be accurately obtained. Consequently, the actual temperature of a silicon wafer to be processed cannot be predicted accurately.

SUMMARY OF THE INVENTION

It is therefore an object of the present invention to predict more accurately the actual temperature or temperature distribution of a wafer subjected to heat in a thermal processing system for a relatively low-temperature process, e.g., plasma-enhanced thermal processing system.

In order to achieve this object, according to the present invention, a test wafer for use in temperature prediction includes a protective film for protecting an amorphous layer.

Specifically, an inventive method is for predicting, using a test wafer, a temperature of a wafer to be loaded into a device fabrication system that generates heat. The method includes the steps of: a) preparing the test wafer, which includes a first semiconductor layer formed in a crystalline state, a second semiconductor layer formed in an amorphous state on the first semiconductor layer, and a protective film formed over the second semiconductor layer; b) loading the test wafer into the device fabrication system and then heating the test wafer for a predetermined period of time in the device fabrication system; c) calculating a recovery rate at which part of the second semiconductor layer that has been heated recovers from the amorphous state to the crystalline state at the interface with the first semiconductor layer; and d) measuring a temperature of the test wafer that has been heated, according to a relationship between the recovery rate and a temperature corresponding to the recovery rate.

According to the inventive method, a protective film is formed over a second semiconductor layer, and thus the surface of the second semiconductor layer is not exposed directly to a plasma. Therefore, decrease in thickness of the second semiconductor layer due to oxidation of the uppermost part thereof can be prevented. Thus, a recovery rate for obtaining the actual temperature of a wafer can be calculated more accurately by the thickness of the second semiconductor layer subjected to heat. As a result, the actual temperature of a wafer to be loaded into a device fabrication system can also be predicted more accurately.

In one embodiment of the present invention, the first and second semiconductor layers may be made of silicon and the protective film may be made of silicon dioxide.

In another embodiment, the test wafer may include a conductive coating, which has been formed over the protective film and contains a metal. If the thermal system used in this embodiment is also used for depositing a film, it is necessary to remove the deposited film so as to measure the thickness of the second semiconductor layer. In this case, if the deposited film has a small etch selectivity with respect to the protective film, the protective film is unintentionally removed simultaneously with the deposited film. Then, the second semiconductor layer acts as an etch stopper layer practically. As a result, after the protective film has been removed, the uppermost part of the second semiconductor layer is damaged. However, if a conductive coating that contains a metal is provided over the protective film, only the deposited film can be removed irrespective of the etch selectivity between the deposited film and the protective film. As a result, the second semiconductor layer will not be damaged.

In still another embodiment, the recovery rate may be calculated by dividing a decrease in thickness of the second semiconductor layer by the predetermined period of time.

In yet another embodiment, the step a) may include the step of measuring a thickness of the second semiconductor layer to obtain an initial thickness thereof. The step b) may include the step of forming a deposited film over the protective film. The step c) may include the steps of: removing the deposited film and then measuring a thickness of the second semiconductor layer that has been heated; and calculating the recovery rate using a decrease in thickness of the second semiconductor layer and the predetermined period of time. The decrease in thickness may be determined by subtracting the thickness of the second semiconductor layer that has been heated from the initial thickness thereof.

In an alternative embodiment, the step a) may include the steps of: measuring a thickness of the second semiconductor layer to obtain an initial thickness thereof; and depositing a conductive coating that contains a metal over the protective film. The step b) may include the step of forming a deposited film over the conductive coating. The step c) may include the step of removing the deposited film and the conductive coating and then measuring a thickness of the second semiconductor layer that has been heated, thereby calculating the recovery rate using a decrease in thickness of the second semiconductor layer and the predetermined period of time. The decrease in thickness may be determined by subtracting the thickness of the second semiconductor layer that has been heated from the initial thickness thereof.

In still another embodiment, the test wafer may have a diameter of about 30.5 cm (12 inches) or more.

In yet another embodiment, temperatures to be predicted may range from about 400° C. to about 600° C., both inclusive.

In still another embodiment, the device fabrication system may be a plasma system.

An inventive test wafer for predicting a temperature of a wafer to be loaded into a device fabrication system that generates heat includes: a first semiconductor layer formed in a crystalline state; a second semiconductor layer formed in an amorphous state on the first semiconductor layer; and a protective film formed over the second semiconductor layer.

In one embodiment, the first and second semiconductor layers may be made of silicon and the protective film may be made of silicon dioxide.

In another embodiment, the test wafer may further include a conductive coating, which has been formed over the protective film and contains a metal.

In still another embodiment, the test wafer may have a diameter of about 30.5 cm (12 inches) or more.

In yet another embodiment, temperatures to be predicted may range from about 400° C. to about 600° C., both inclusive.

In still another embodiment, the device fabrication system may be a plasma system.

DESCRIPTION OF THE PREFERRED EMBODIMENTS

Embodiment 1

Hereinafter, a first embodiment of the present invention will be described with reference to the drawings.

Figure 1:
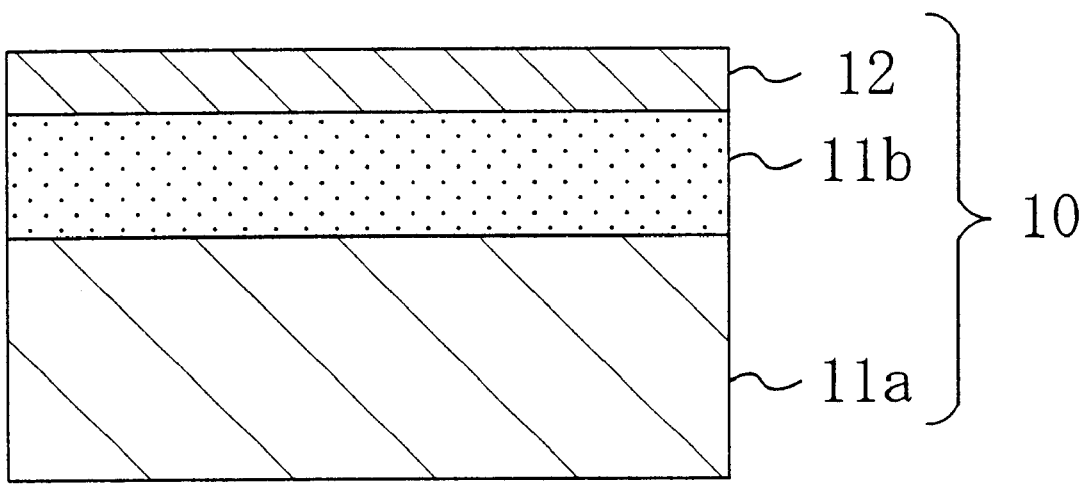
FIG. 1 is a cross-sectional view illustrating the structure of a test wafer for use in temperature prediction according to a first embodiment of the present invention.

FIG. 1 shows a cross-sectional structure of a test wafer for use in temperature prediction according to the first embodiment.

As shown in FIG. 1, a test wafer 10 according to the first embodiment is made up of: a first semiconductor layer 11a of single crystalline silicon; a second semiconductor layer 11b of amorphous silicon; and a passivation film 12 of silicon dioxide as a protective film, for example. The second semiconductor layer 11b is formed on the first semiconductor layer 11a and has a thickness of 41 nm. The passivation film 12 is formed on the second semiconductor layer 11b and has a thickness of about 3 nm.

Hereinafter, process steps for forming the test wafer 10 having such a structure will be described with reference to FIGS. 2A and 2B.

Figure 2A:
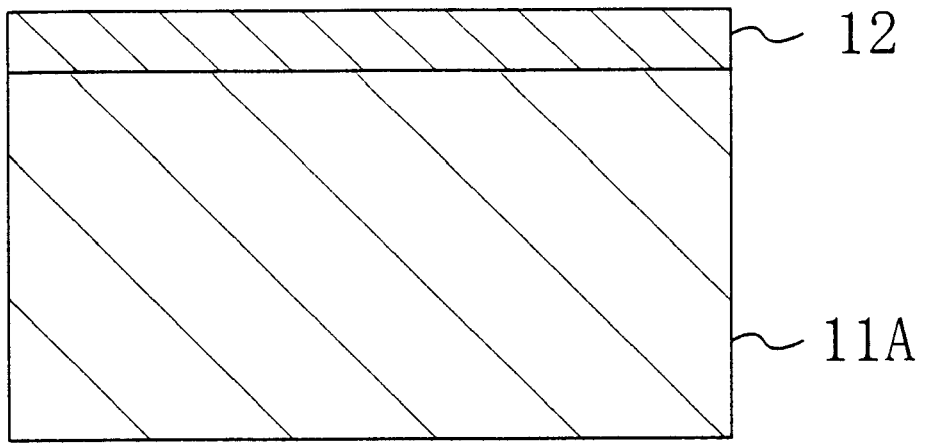
FIGS. 2A and 2B are cross-sectional views showing process steps for forming the test wafer of the first embodiment.

First, as shown in FIG. 2A, a silicon wafer 11A is thermally oxidized in a dinitrogen oxide ($N_2O$) ambient, thereby forming a passivation film 12 of silicon dioxide (SiO$_2$) with a thickness of about 3 nm in the uppermost part of the silicon wafer 11A.

Figure 2B:
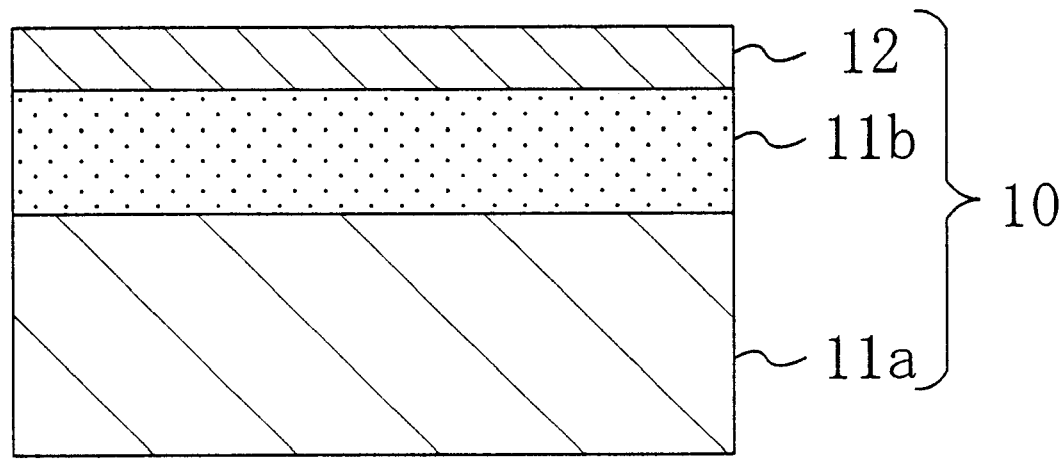

Next, as shown in FIG. 2B, arsenic (As) ions are implanted into the silicon wafer 11A through the passivation film 12 at a dose of about 3×10$^{14}$ cm$^{-2}$ with an accelerating voltage of about 30 keV. In this manner, a second semiconductor layer 11b of amorphous silicon with a thickness of 41 nm is formed in the silicon wafer 11A. As a result, the part of the silicon wafer 11A other than the second semiconductor layer 11b now becomes a first semiconductor layer 11a of single crystalline silicon.

Hereinafter, a method for predicting a temperature when the test wafer 10 is applied to a plasma CVD system will be described with reference to the drawings.

Figure 3:
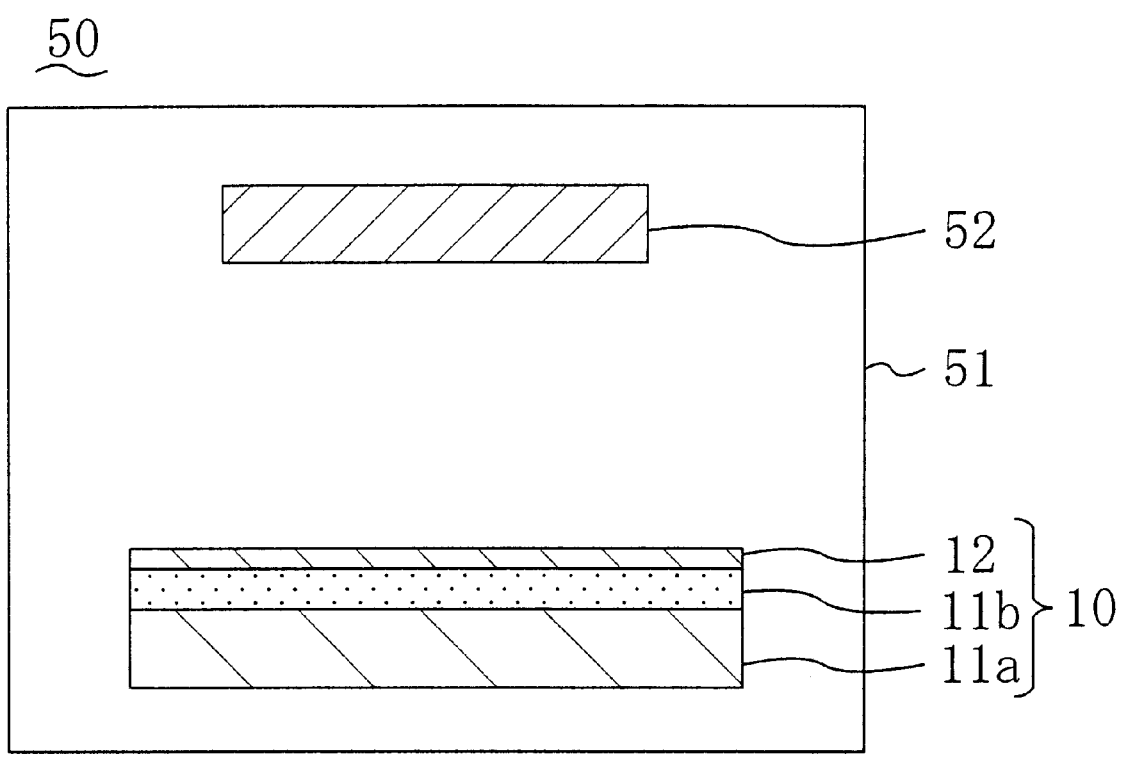
FIG. 3 is a cross-sectional view schematically showing a plasma CVD system for the temperature prediction of the first embodiment.

First, as shown in FIG. 3, a first test wafer 10 is loaded into a reactor 51 of a plasma CVD system 50 so that the passivation film 12 of the first test wafer 10 faces an electrode 52.

Subsequently, a fluorosilicate glass (FSG) film is deposited for 10 seconds over the passivation film 12 of the first test wafer 10 at a predetermined temperature T with, for example, silicon tetrafluoride (SiF$_4$), monosilane (SiH$_4$) and dinitrogen oxide (N$_2$O) used as materials for the FSG film.

Then, the first test wafer 10 processed by a plasma CVD method is replaced by a non-processed second test wafer 10. Thereafter, an FSG film is deposited for 30 seconds over the second test wafer 10 under the same deposition conditions as that for the first test wafer 10. In the same manner, an FSG film is deposited for 50 seconds over a third test wafer 10. The FSG film is a silicon dioxide film doped with fluorine.

The accompanying table shows the relationships between the deposition time of the FSG film and the thickness of the remaining amorphous layer.

| Deposition time (s) | Thickness (nm) of FSG film | Thickness (nm) of remaining amorphous layer |
| --- | --- | --- |
| 0 | — | 41.0 |
| 10 | 50 | 38.7 |
| 30 | 100 | 36.1 |
| 50 | 150 | 35.7 |

Subsequently, a method for measuring the thickness of the second semiconductor layer 11b (i.e., the remaining amorphous layer) of the test wafer 10 over which the FSG film has been deposited will be described with reference to FIGS. 4A through 4C.

Figure 4A:
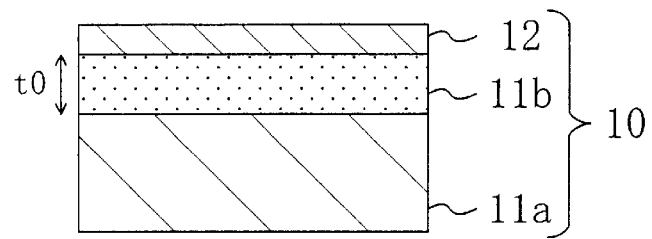
FIGS. 4A through 4C are cross-sectional views showing structures of the test wafer corresponding to respective process steps in the temperature prediction of the first embodiment.

First, FIG. 4A shows a cross-sectional structure of a non-processed test wafer 10. At this time, the second semiconductor layer 11b is supposed to have an initial thickness t0.

Figure 4B:
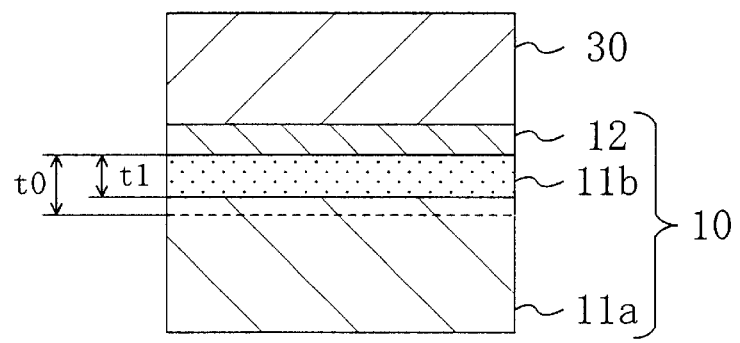

FIG. 4B shows a cross-sectional structure of the test wafer 10 where the FSG film 30 is deposited over the passivation film 12. Supposing the second semiconductor layer 11b has a thickness t1 after being subjected to heat in depositing the FSG film at a temperature T, the thickness of the second semiconductor layer 11b decreases from the initial thickness t0 to the thickness t1 as shown in FIG. 4B. The interface between the non-processed first and second semiconductor layers 11a and 11b shown in FIG. 4A is indicated as the broken line in FIGS. 4B and 4C.

Figure 4C:
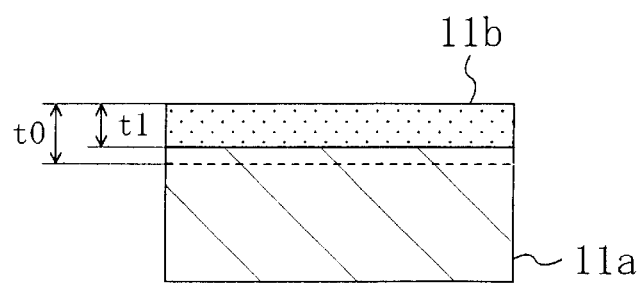

Next, as shown in FIG. 4C, the FSG film 30 and passivation film 12 are removed by a wet etching process using a buffered hydrofluoric acid solution, thereby exposing the second semiconductor layer 11b. In the first embodiment, since the passivation film 12 is made of silicon dioxide, the etch selectivity of the passivation film 12 to the FSG film 30 is substantially zero. Hence, the FSG film 30 and passivation film 12 are simultaneously removed. Alternatively, the passivation film 12 may be made of silicon nitride. Then, only the FSG film 30 can be removed selectively. That is to say, to measure the thickness t1 of the second semiconductor layer 11b with a spectroscopic ellipsometer, at least the FSG film 30 may be removed.

Thereafter, the thickness t1 of the second semiconductor layer 11b is measured with a spectroscopic ellipsometer at a plurality of points all over the surface of each of the first through third test wafers 10.

Figure 5:
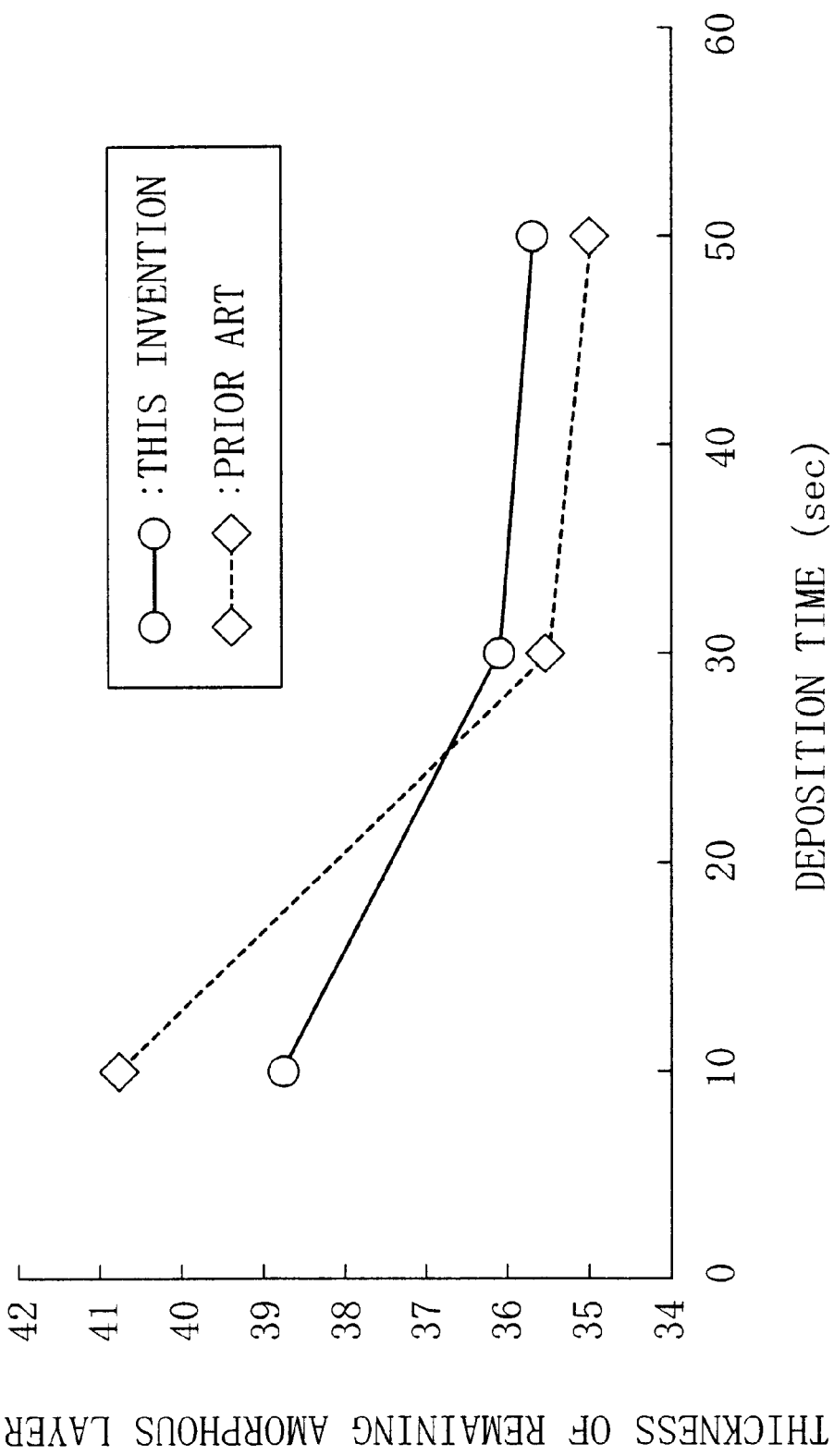
FIG. 5 is a graph for comparing a relationship between the deposition time and the thickness of a remaining amorphous layer (i.e., a second semiconductor layer) of the first embodiment with that of a known method.
Figure 10A:
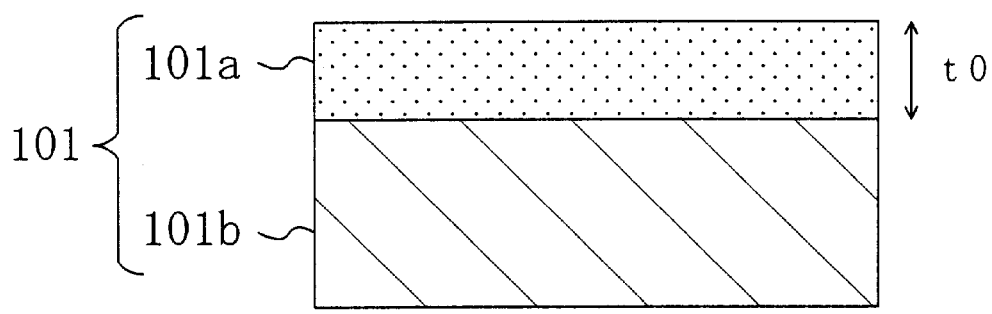
FIGS. 10A and 10B are cross-sectional views showing process steps for forming a known test wafer.
Figure 10B:
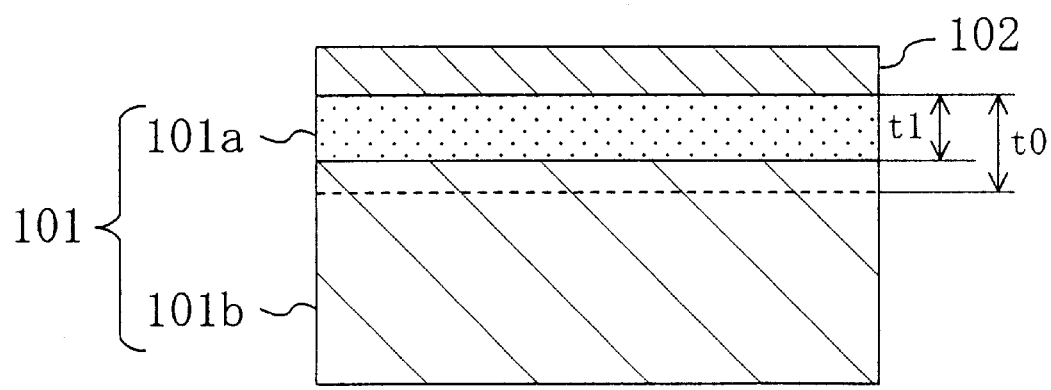

FIG. 5 shows relationships between the deposition time and the thickness of the second semiconductor layer (i.e., the remaining amorphous layer). The ordinate represents the thickness t1 of the remaining amorphous layer, while the abscissa represents the deposition time of the FSG film 30. The solid-line curve indicates the relationship thereof when the test wafer of the first embodiment is applied. The broken-line curve indicates the relationship thereof when the known test wafer, including no passivation film as shown in FIG. 10A, is applied.

As shown in FIG. 5, the thickness of the remaining amorphous layer decreases almost in proportion to the deposition time, i.e., a period of time in which the test wafer 10 is subjected to heat.

Hereinafter, it will be described how to obtain a real temperature, to which the test wafer 10 of the first embodiment is subjected, using the decrease in thickness of the remaining amorphous layer shown in FIG. 5.

For example, as indicated by the solid-line curve, the thickness of the remaining amorphous layer decreases from 38.7 nm at the deposition time of 10 sec. to 36.1 nm at the deposition time of 30 sec. Thus, the recovery rate of the amorphous layer is 2.6 nm/20 sec., i.e., 7.8 nm/min. If the recovery rate is applied to the equivalence graph shown in FIG. 11, the equivalence graph indicates that the real temperature of the test wafer 10 in the plasma CVD system reaches 530° C.

Figure 11:
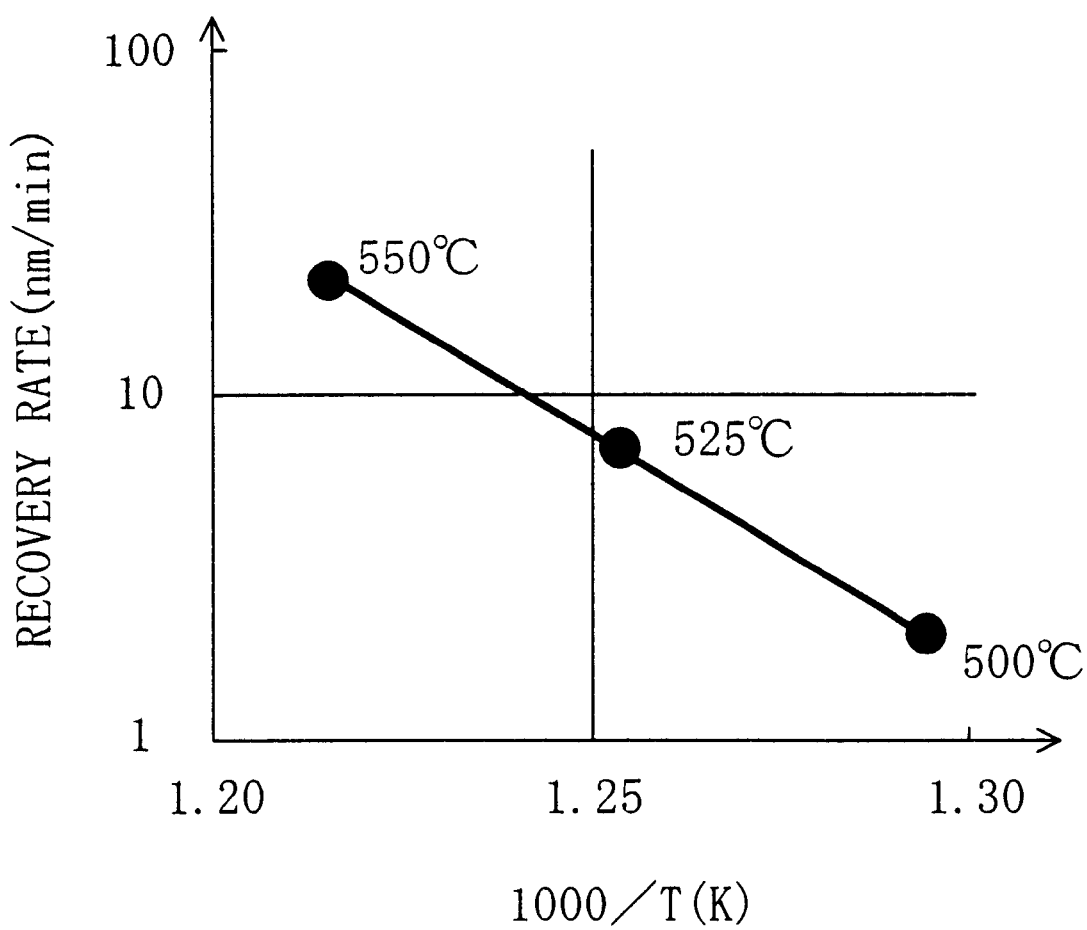
FIG. 11 is a graph showing a relationship between a recovery rate of an amorphous layer and a temperature.

On the other hand, as indicated by the broken-line curve, if the known test wafer is applied, the thickness of the remaining amorphous layer decreases by about 4.7 nm from the deposition time of 10 sec. to 30 sec. Thus, the recovery rate of the amorphous layer is higher than that of the first embodiment. Hence, the real temperature of the test wafer obtained from the graph shown in FIG. 11 is erroneous because the thickness of the remaining amorphous layer has been further decreased as described above, and the temperature found in the equivalence graph is higher than the real temperature.

As described above, in the first embodiment, a passivation film 12 is formed over a second semiconductor layer 11b of amorphous silicon in the uppermost part of a test wafer. Thus, it is possible to prevent the surface of the second semiconductor layer 11b from being oxidized by a plasma. As a result, the recovery rate, at which part of the second semiconductor layer 11b recovers from the amorphous state to crystalline state by heat rather than a plasma, in the plasma CVD system, can be obtained. Thus, the real temperature of the test wafer and in-wafer-plane distribution of temperatures can be measured more precisely.

The passivation film 12 can prevent the surface of the second semiconductor layer 11b from being oxidized by a plasma. In addition, the passivation film 12 can also prevent contaminations, other than arsenic ions, from being introduced during the ion implantation for forming the second semiconductor 11b.

Also, since the test wafer 10 is made of the same silicon wafer as that to be diced into semiconductor chips as products, the actual temperature of a silicon wafer to be loaded into a device fabrication system can be predicted accurately.

Figure 6:
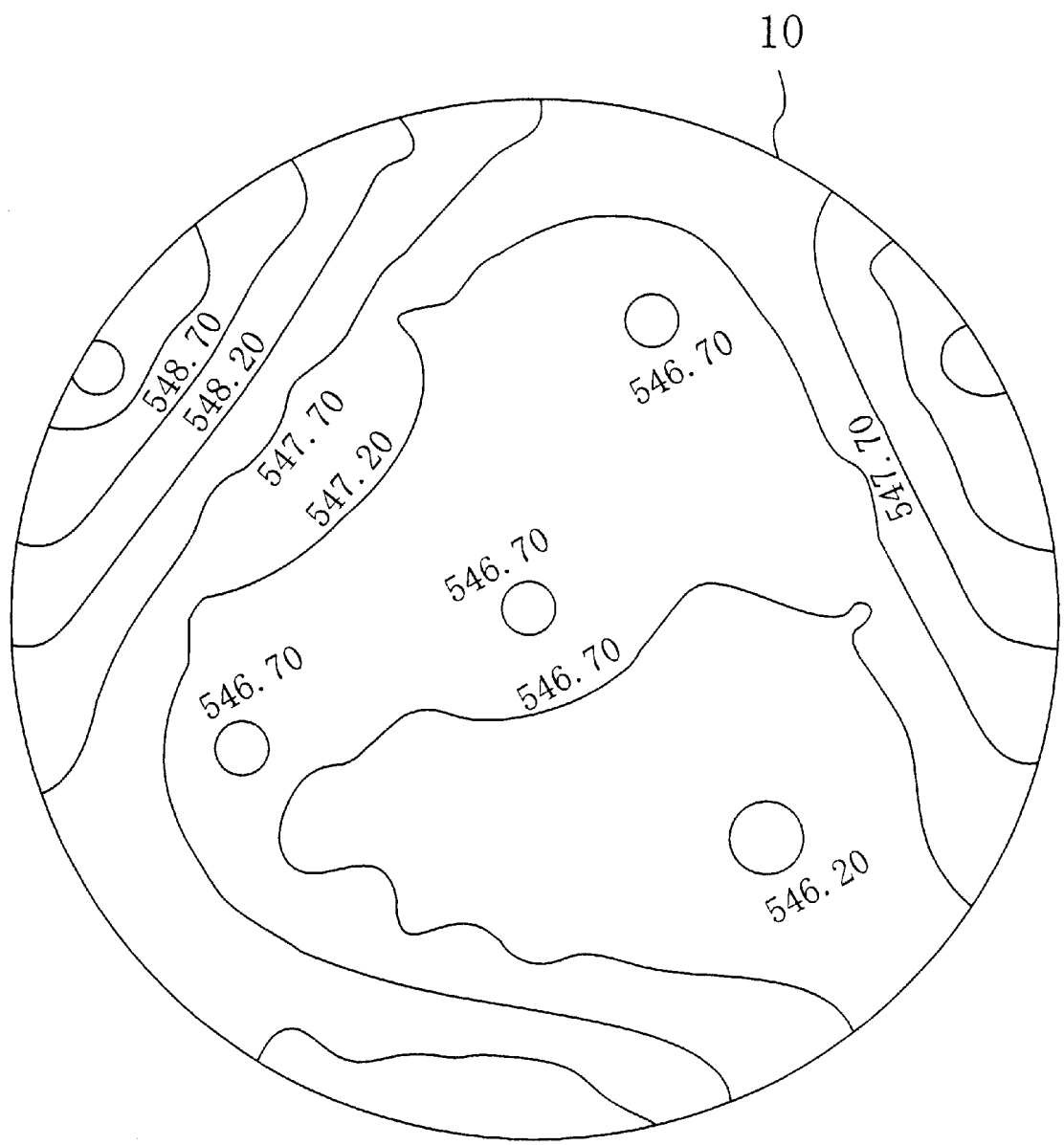
FIG. 6 is a diagram illustrating the distribution of temperatures in a wafer plane obtained by the temperature prediction of the first embodiment.

Further, as shown in FIG. 6, if the distribution of the recovery rates, at which part of the second semiconductor layer 11b recovers from the amorphous state to crystalline state in the test wafer 10, is calculated, the in-wafer-plane distribution of temperatures of the test wafer 10, including its periphery as well as its center, can be measured more precisely. Accordingly, even for a wafer that has a diameter of 30.5 cm (12 inches) or more and thus is likely to lack in-wafer-plane uniformity of temperatures, the temperature of the wafer can be controlled easily as intended.

In the first embodiment, the test wafer 10 is applied to the plasma CVD system as a device fabrication system in which the FSG film is deposited. However, the present invention is not limited to this embodiment.

For example, the test wafer 10 may be applied to the plasma CVD system in which a silicon dioxide film, which is not doped with fluorine, is deposited.

Alternatively, the test wafer 10 may be applied to a plasma etching system instead of the plasma CVD system.

The test wafer 10 may also be applied to a thermal CVD system in which a polysilicon film is deposited or to a sputtering system.

As described above, the known test wafer does not include a passivation film deposited over a second semiconductor layer 11b. Thus, the thickness of the part of the second semiconductor layer 11b that has decreased due only to the epitaxial growth cannot be measured accurately. As a result, the recovery rate cannot be obtained accurately. In contrast, the test wafer of the first embodiment includes the passivation film 12, and hence is effective in eliminating such a problem of the known test wafer.

In the first embodiment, wafer temperatures to be predicted are set in the range from about 400° C. to about 600° C., both inclusive. This is because of the following reasons. Since the test wafer 10 is made of silicon, at wafer temperatures of lower than 400° C. the second semiconductor layer 11b is crystallized so slowly, i.e., the thickness thereof is decreased so slowly, that the recovery rate might be obtained inaccurately. On the other hand, at wafer temperatures of more than 600° C., the thickness of the second semiconductor layer 11b is increased so rapidly.

For example, if the second semiconductor layer 11b of the test wafer 10 is formed by implanting arsenic ions, the wafer temperature that can be predicted ranges from, for example, about 475° C. to about 575° C., depending on the conditions for the ion implantation. If silicon (Si) ions are implanted into the wafer, the recovery rate becomes lower and the range of wafer temperatures that can be predicted shifts to higher temperatures compared to that of a wafer into which arsenic ions are implanted. Thus, the wafer temperatures up to about 600° C. can be predicted. On the other hand, if germanium (Ge) and boron (B) ions are implanted into the wafer, the range of wafer temperatures that can be predicted shifts to lower temperatures. Thus, the wafer temperatures down to about 400° C. can also be predicted.

Embodiment 2

Hereinafter, a second embodiment of the present invention will be described with reference to the drawings.

Figure 7:
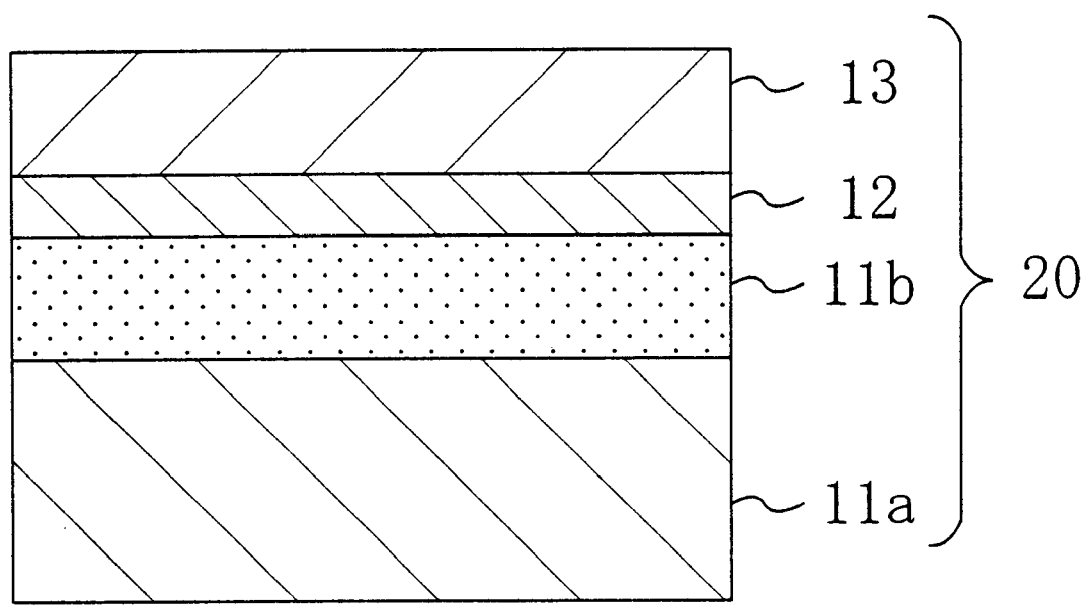
FIG. 7 is a cross-sectional view showing a test wafer for use in temperature prediction according to a second embodiment of the present invention.

FIG. 7 shows a cross-sectional structure of a test wafer for use in temperature prediction according to the second embodiment. In FIG. 7, each member already shown in FIG. 1 is identified by the same reference numeral and the description thereof will be omitted herein.

As shown in FIG. 7, a test wafer 20 for the second embodiment includes a conductive coating 13 of titanium nitride (TiN), for example, formed over a passivation film 12.

Hereinafter, process steps for forming the test wafer 20 having such a structure will be described with reference to FIGS. 8A through 8C.

Figure 8A:
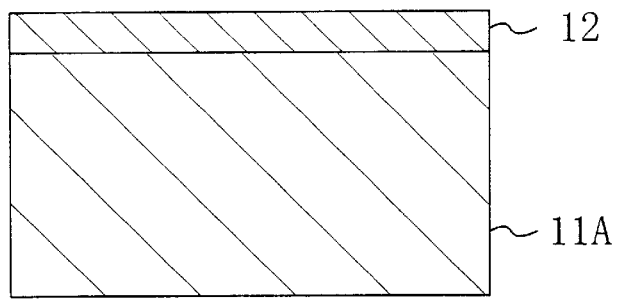
FIGS. 8A through 8C are cross-sectional views showing structures of the test wafer corresponding to respective process steps for forming the test wafer of the second embodiment.

First, as shown in FIG. 8A, a silicon wafer 11A is thermally oxidized in a dinitrogen oxide ($N_2O$) ambient, thereby forming a passivation film 12 of silicon dioxide with a thickness of about 3 nm in the uppermost part of the silicon wafer 11A. The passivation film 12 acts as a protective film.

Figure 8B:
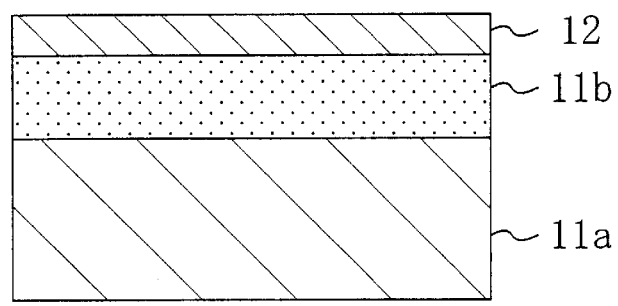

Next, as shown in FIG. 8B, arsenic ions are implanted into the silicon wafer 11A through the passivation film 12 at a dose of about $3 \times 10^{14}$ cm$^{-2}$ with an accelerating voltage of about 30 keV. In this manner, a second semiconductor layer 11b of amorphous silicon is formed in the silicon wafer 11A. As a result, the part of the silicon wafer 11A other than the second semiconductor layer 11b now becomes a first semiconductor layer 11a of single crystalline silicon.

Figure 8C:
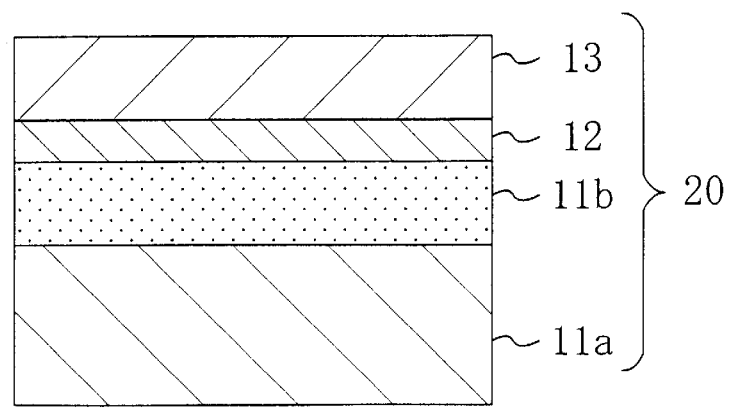

Then, as shown in FIG. 8C, a conductive coating 13 of titanium nitride is formed over the passivation film 12 by, for example, a sputtering process. As a result, the test wafer 20 includes the conductive coating 13 as the uppermost part thereof.

Hereinafter, a method for predicting a wafer temperature when the test wafer 20 is applied to a plasma CVD system, for example, will be described with reference to the drawings.

Figure 9A:
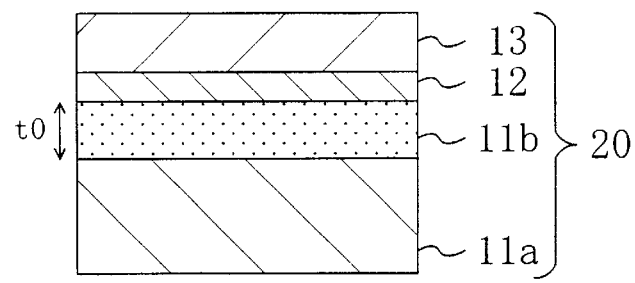
FIGS. 9A through 9D are cross-sectional views showing structures of the test wafer corresponding to respective process steps in the temperature prediction of the second embodiment.

FIG. 9A shows a cross-sectional structure of a non-processed test wafer 20. At this time, the second semiconductor layer 11b is supposed to have an initial thickness t0. The interface between the first and second semiconductor layers 11a and 11b shown in FIG. 9A, which are not subjected to heat, is indicated as the broken line drawn in the first semiconductor layer 11a illustrated in FIGS. 9B through 9D.

Figure 9B:
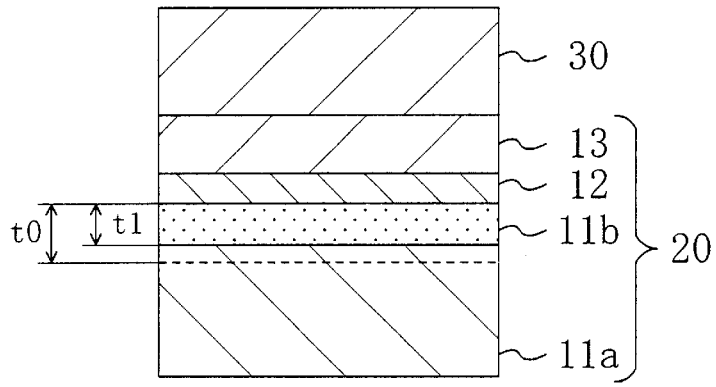

FIG. 9B shows a cross-sectional structure of a test wafer 20 where an FSG film 30 has been deposited over the conductive coating 13. The test wafer 20 is subjected to heat during the deposition of the FSG film 30. Supposing the second semiconductor layer 11b has a thickness t1 after subjected to heat during the deposition, the thickness of the second semiconductor layer 11b decreases from the initial thickness t0 to the thickness t1.

Figure 9C:
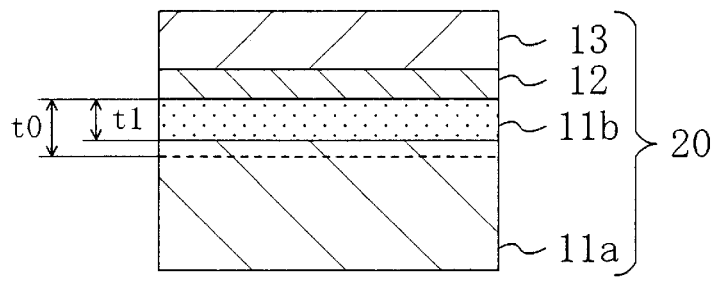

Next, as shown in FIG. 9C, the FSG film 30 is removed by a wet etching process using a buffered hydrofluoric acid solution, thereby exposing the conductive coating 13.

Since the conductive coating 13 is made of titanium nitride in the second embodiment, the etch selectivity of the FSG film 30 to the conductive coating 13 is so high that only the FSG film 30 can be removed selectively.

Figure 9D:
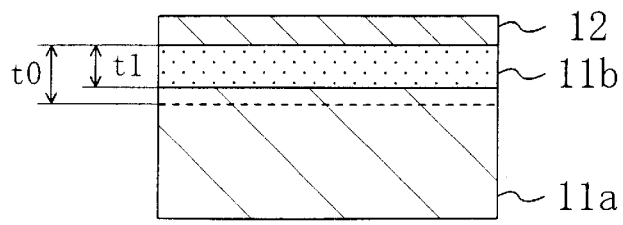

Then, as shown in FIG. 9D, if a chlorine ($Cl_2$) gas, for example, is used as an etching gas, the conductive coating 13 is removed selectively with respect to the passivation film 12.

Thereafter, the thicknesses ti of the second semiconductor layer 11b are measured through the passivation film 12 with a spectroscopic ellipsometer at points all over the surface of the test wafer 20. Next, the recovery rate R is calculated from the initial thickness t0 of the non-processed second semiconductor layer 11b, the thickness t1 of the processed second semiconductor layer 11b and a period of time a in which the wafer is subjected to heat during the deposition of the FSG film. In this manner, the actual wafer temperature can be predicted from the equivalence graph shown in FIG. 11.

In the second embodiment, the test wafer 20 includes the conductive coating 13 of titanium nitride, formed over the passivation film 12 of silicon dioxide. Thus, only the FSG film 30 deposited in the plasma CVD system can be etched away selectively. That is to say, the conductive coating 13 acts as an etch stopper layer for the FSG film 30.

Also, the etch selectivity of the conductive coating 13 to the passivation film 12 is so high that the passivation film 12 remains unetched over the second semiconductor layer 11b. Therefore, the uppermost part of the second semiconductor layer 11b does not disappear, and has its surface state unchanged even after the deposition (i.e., the heat treatment). As a result, the thickness t1 of the second semiconductor layer 11b that has been subjected to heat can be measured more accurately, and hence the recovery rate can also be obtained more accurately.

The passivation film 12 and conductive coating 13 can prevent the uppermost part of the second semiconductor layer 11b from being oxidized during the deposition. In addition, the introduction of contaminations, other than arsenic ions, into the second semiconductor layer 11b can be suppressed when the ions are implanted to form the second semiconductor layer 11b.

The passivation film 12 is made of silicon dioxide. Alternatively, silicon nitride or silicon oxynitride may be used for the passivation film 12.

Also, the conductive coating 13 is made of titanium nitride. Alternatively, a metal such as cobalt (Co), nickel (Ni) or platinum (Pt) may be used for the conductive coating 13. Hence, if a metal or a metal compound for the conductive coating 13 is conformed to, for example, the material used for siliciding semiconductor chips to be products, the actual temperature of a wafer to be processed can be predicted accurately.

In the first and second embodiments, the first semiconductor layer 11a is made of the silicon wafer. However, the present invention is not limited to these embodiments. Alternatively, the first semiconductor layer 11a may be formed in a wafer made of a material other than silicon or by bonding wafers.

The first and second semiconductor layers 11a and 11b do not always have to be made of silicon. Alternatively, the layers 11a and 11b may be made of gallium arsenide (GaAs), germanium (Ge) or indium phosphide (InP), for example.

What is claimed is:

1. A method for predicting, using a test wafer, a temperature of a wafer to be loaded into a device fabrication system that fabricates a device using plasma, the method comprising the steps of:
    a) preparing the test wafer, which includes a first semiconductor layer formed in a crystalline state, a second semiconductor layer formed in an amorphous state on the first semiconductor layer, and a plasma protective film with a plasma resistance formed over the second semiconductor layer;
    b) loading the test wafer into the device fabrication systems and then performing a treatment using plasma on the test wafer for a predetermined period of time in the device fabrication system;
    c) calculating a recovery rate at which part of the second semiconductor layer, on which the treatment using plasma is performed, recovers from the amorphous state to the crystalline state at the interface with the first semiconductor layer; and
    d) measuring a temperature of the test wafer on which the treatment using plasma is performed, according to a relationship between the recovery rate and a temperature corresponding to the recovery rate.

2. The method of claim 1, wherein the first semiconductor layer and the second semiconductor layer are made of silicon and the protective film is made of silicon dioxide.

3. The method of claim 1, wherein the recovery rate is calculated by dividing a decrease in thickness of the second semiconductor layer by the predetermined period of time.

4. The method of claim 1, wherein the test wafer has a diameter of about 30.5 cm or more.

5. The method of claim 1, wherein temperatures to be predicted range from about 400° C. to about 600° C., both inclusive.

6. A method for predicting, using a test wafer, a temperature of a wafer to be loaded into a device fabrication system that generates heat, the method comprising the steps of:
    a) preparing the test wafer, which includes a first semiconductor layer formed in a crystalline state, a second semiconductor layer formed in an amorphous state on the first semiconductor layer, a protective film formed over the second semiconductor layer and a conductive coating, which has been formed over the protective film and contains a metal;
    b) loading the test wafer into the device fabrication systems and then heating the test wafer for a predetermined period of time in the device fabrication system;
    c) calculating a recovery rate at which part of the second semiconductor layer that has been heated recovers from the amorphous state to the crystalline state at the interface with the first semiconductor layer; and
    d) measuring a temperature of the test wafer that has been heated, according to a relationship between the recovery rate and a temperature corresponding to the recovery rate.

7. A method for predicting, using a test wafer, a temperature of a wafer to be loaded into a device fabrication system that generates heat, the method comprising the steps of:
    a) preparing the test wafer, which includes a first semiconductor layer formed in a crystalline state, a second semiconductor layer formed in an amorphous state on the first semiconductor layer and a protective film formed over the second semiconductor layer, and measuring a thickness of the second semiconductor layer to obtain an initial thickness of the second semiconductor layer;
    b) loading the test wafer into the device fabrication systems and then heating the test wafer for a predetermined period of time in the device fabrication system, and forming a deposited film over the protective film;
    c) calculating a recovery rate at which part of the second semiconductor layer that has been heated recovers from the amorphous state to the crystalline state at the interface with the first semiconductor layer, removing the deposited film and then measuring a thickness of the second semiconductor layer that has been heated, and calculating the recovery rate using a decrease in thickness of the second semiconductor layer and the predetermined period of time, the decrease in thickness being determined by subtracting the thickness of the second semiconductor layer that has been heated from the initial thickness of the second semiconductor layer; and
    d) measuring a temperature of the test wafer that has been heated, according to a relationship between the recovery rate and a temperature corresponding to the recovery rate.

8. A method for predicting, using a test wafer, a temperature of a wafer to be loaded into a device fabrication system that generates heat, the method comprising the steps of:

a) preparing the test wafer, which includes a first semiconductor layer formed in a crystalline state, a second semiconductor layer formed in an amorphous state on the first semiconductor layer, and a protective film formed over the second semiconductor layer, measuring a thickness of the second semiconductor layer to obtain an initial thickness of the second semiconductor layer, and depositing a conductive coating that contains a metal over the protective film;

b) loading the test wafer into the device fabrication systems and then heating the test wafer for a predetermined period of time in the device fabrication system, and forming a deposited film over the conductive coating;

c) calculating a recovery rate at which part of the second semiconductor layer that has been heated recovers from the amorphous state to the crystalline state at the interface with the first semiconductor layer, and removing the deposited film and the conductive coating and then measuring a thickness of the second semiconductor layer that has been heated, thereby calculating the recovery rate using a decrease in thickness of the second semiconductor layer and the predetermined period of time, the decrease in thickness being determined by subtracting the thickness of the second semiconductor layer that has been heated from the initial thickness of the second semiconductor layer; and d) measuring a temperature of the test wafer that has been heated, according to a relationship between the recovery rate and a temperature corresponding to the recovery rate.

9. A test wafer for predicting a temperature of a wafer to be loaded into a device fabrication system that fabricates device using plasma, the test wafer comprising:

a first semiconductor layer formed in a crystalline state;

a second semiconductor layer formed in an amorphous state on the first semiconductor layer; and a plasma protective film with a plasma resistance formed on the second semiconductor layer.

10. The test wafer of claim 9, wherein the first semiconductor layer and the second semiconductor layer are made of silicon and the protective film is made of silicon dioxide.

11. The test wafer of claim 9 further comprising a conductive coating, which has been formed over the protective film and contains a metal.

12. The test wafer of claim 9, wherein the test wafer has a diameter of about 30.5 cm or more.

13. The test wafer of claim 9, wherein temperatures to be predicted range from about 400° C. to about 600° C., both inclusive.

* * * * *